Dec. 10, 1935.  J. SNEED  2,023,650
SHOCK ABSORBER
Original Filed Feb. 21, 1929    2 Sheets-Sheet 1
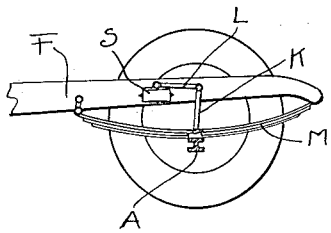
FIG.-1
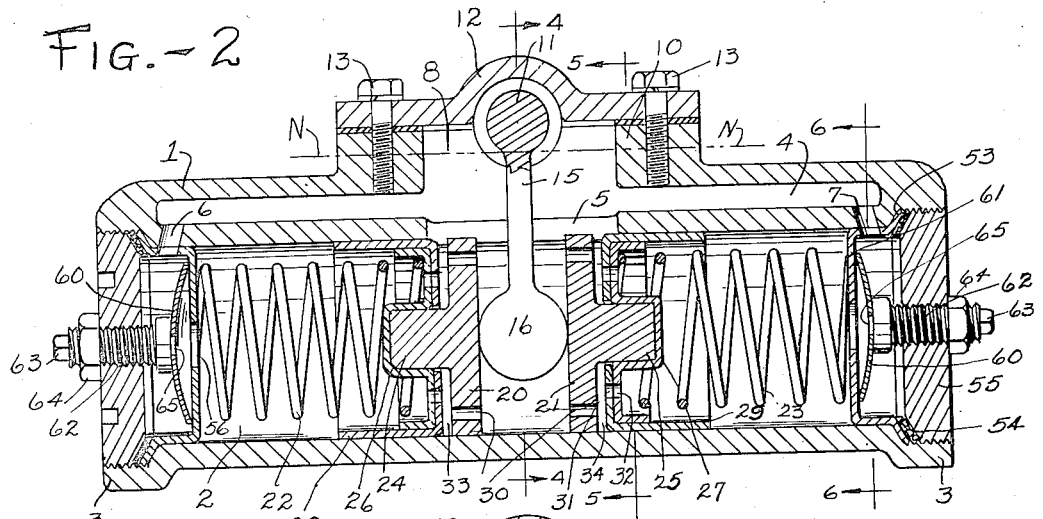
FIG.-2
FIG.-3
John Sneed
Inventor Dec. 10, 1935.     J. SNEED     2,023,650

SHOCK ABSORBER

Original Filed Feb. 21, 1929    2 Sheets-Sheet 2

Patented Dec. 10, 1935

2,023,650

UNITED STATES PATENT OFFICE 2,023,650

SHOCK ABSORBER

John Sneed, Grosse Pointe Shores, Mich.

Application February 21, 1929, Serial No. 341,574
Renewed March 25, 1935

16 Claims. (Cl. 267—8)

This invention relates to a device for controlling the rate and character of movement between the frame and axle of a vehicle resulting from road shocks. Such a device is termed a shock absorber and this invention is embodied in a double acting hydraulic type.

It is among the objects of my invention to provide a shock absorber made of relatively few and simple parts which can be economically constructed and readily assembled. Another object is to provide a relief and check valve which is readily adjustable, simple in construction and may endure through long usage. Another object is to arrange a system of fluid checks and valves all of which may be made of simple stamped parts and which can be very easily assembled or replaced. A still further object is to provide a shock absorber which will have a constant idle range regardless of the load carried by the vehicle.

Other objects will appear from the following description of my invention reference being had to the accompanying drawings, wherein a preferred form is illustrated. The essential characteristics are summarized in the claims.

Figure 4:
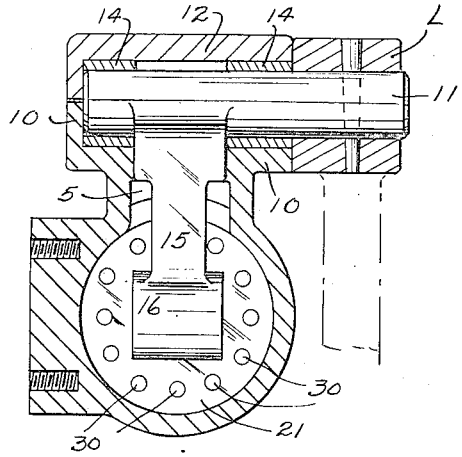
Figure 5:
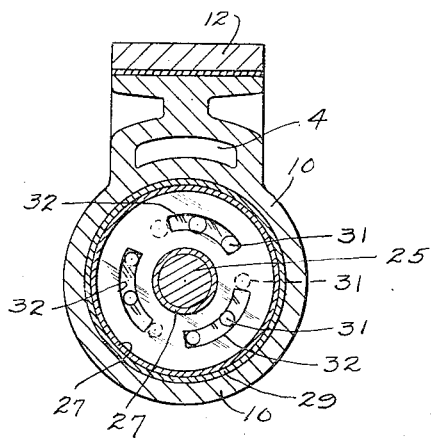
Figure 6:
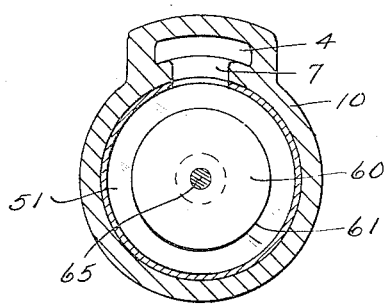

In the drawings, Fig. 1 is an elevation of my shock absorber as mounted on a vehicle; Fig. 2 is a longitudinal section showing the parts in a normal idle position; Fig. 3 is a section similar to Fig. 1 showing the parts in the position assumed near the end of the working stroke; Figs. 4, 5, and 6 are sections taken along the lines 4—4, 5—5, and 6—6 respectively of Fig. 2.

Referring to the drawings, particularly Fig. 1, I illustrate the shock absorber S secured to the side rail of a vehicle frame F, having an operating lever L extending generally horizontally and connected to the axle A of the vehicle through a link K. My shock absorber is preferably arranged to act to control movement of the axle both toward and away from the vehicle frame. Thus the link K is subjected to loads both in tension and compression through the resistance offered by the shock absorber. The chassis may be carried by the usual leaf spring M and as mentioned above, I provide that the shock absorber have an idle range within which the spring end may flex freely as the vehicle progresses over slightly uneven surfaces regardless of the load in the vehicle.

Referring more particularly to Fig. 2, my device comprises a casing 1 bored to provide an open ended cylinder 2, having outwardly flared internally threaded ends 3. As also shown in Figs. 4, 5, and 6, there is provided a horizontal passageway 4 above the cylinder which communicates with the mid portion of the cylinder through the opening 5, (see Fig. 4) and communicates with the ends of the cylinder through passageways 6 and 7.

Formed above the central opening 5 of the cylinder is a chamber 8 in open communication both with the passageway 4 and with the cylinder. In the operation of the device, it is intended that it be flooded with fluid such as oil up to substantially the level of the line N. Thus for movement of the parts beyond the limits to be presently described, fluid must be disposed from one part to another of the structure.

Referring to Figs. 2 and 4, I provide on the upper part of the cylinder a raised boss 10 which provides a journal for an operating shaft 11. A closure or bearing cap 12 is secured by such means as cap screws 13. Suitable bushings or bearings 14 may be provided between the shaft and its journal. It will be noted that the level of operating fluid is substantially high enough to wet the bearings but the elevation of the bearings is such that no fluid is lost by escape therethrough.

Integrally formed with the shaft 11 or otherwise secured thereto is a depending arm 15 having a cylindrically formed end 16 which is engageable with the working parts of the device. The lever L, mentioned above, is secured to the free end of the shaft 11 so that movement of the lever is controlled according to the resistance applied to the end 16 of the arm 15.

Sliding within the cylinder 2 are oppositely facing pistons 20 and 21, both contacting with the cylindrical part 16 of the arm 15 and maintained in such contact by springs 22 and 23. The pistons 20 and 21 are similarly formed and have central outwardly extending bosses 24 and 25 over which lie similarly formed cup-shaped members 26 and 27. The cup-shaped members have centrally depressed parts closely engaging the bosses of the pistons and having radially extending disc-like parts spaced from the outer faces of the pistons, as illustrated.

Additional cup-shaped members 28 and 29 lie between the outer annular walls of the cup-shaped members 26 and 27 and the walls of the cylinder 2 and also have radial parts lying between the outer radial faces of the pistons and the inward radial faces of the cup-shaped members 26 and 27. It will be noted that the radial parts of the members 28 and 29 do not fill the spaces between the radial parts of the members 26 and 27 and the outer faces of the pistons and that when the parts have assumed the position illustrated in Fig. 3 there has been a relative movement between the piston 20 and the member 28 as well as between the member 26 and the member 28. In other words, in idle position the members 26 and 28 have radial faces in contact but during a working stroke, the radial face of the member 28 lies against the outer radial face of the piston 20, as at 40, (see Fig. 3).

Referring to Figs. 1, 4, and 5, I will further describe the arrangement and functional relation between the piston 21 and the cups 27 and 29. Inasmuch as the piston 20 and the cups 26 and 28 are similarly constructed and arranged, it is understood both groups of parts function similarly and in like manner. The piston 21, as shown in Figs. 1 and 4, has a plurality of openings or ports 30 equally spaced from the periphery thereof through which fluid may freely pass unless otherwise restrained. Referring also to Fig. 5, it will be seen that the cup 29 also has a plurality of circular openings 31 spaced radially inward from the circle of the openings 30 and arranged so that the openings 30 and 31 do not match when the radial faces of the cups 29 and the piston 21 contact. As also shown in Fig. 4, the inner cup 27 has a plurality of elongated openings 32 arranged to match the openings 31 of the member 29. As long as the radial faces of the cups 27 and 29 are in contact, a fluid passageway is provided through the piston and through both cups but that whenever the radial face of the piston contacts with the radial faces of the outer or greater cup 29, then the passage is closed and that fluid must flow through another passage, to be presently described, if the piston is to be moved.

Referring back to Figs. 2 and 3, it will be noted that there exists between the pistons 20 and 21 and the greater cups 28 and 29 radial spaces 33 and 34 which spaces are determined by the relation between the length of the bosses 24 and 25 and the depth of the central depression in the inner cups 26 and 27. When the end 16 of the arm 15 is moved in either direction and while the greater cups 28 and 29 remain stationary, the pistons are free to move until all of the fluid has been forced out of the spaces 33 or 34 either through the small ports 30 or directly into the chamber 8. Resistance is only offered to movement of the arm 15 after the outer or rearward faces of one or the other of the pistons contact with one or the other of the greater cups 28 or 29. Thus in designing my shock absorber, I provide that the spaces 33 and 34 be as great or as small as desired depending upon the extent of free motion intended for the arm.

Referring also to Fig. 3, it will appear that after the piston 20 has been moved into contact with the greater cup 28, that ports in the cup and piston are closed by contact with solid parts of each other and that the piston is moved only against the fluid pressure created behind it. It will also be noted in Fig. 3, that while the piston 20 is moved to the left, as indicated, that the piston 21 also moves to the left and is held in contact with the end 16 of the arm 15 and that the greater cup 29 still remains out of contact with the piston 21 by reason of the fact that the spring 23 acts upon the piston through the inner or lesser cup 27. The movement of the piston 21 to the left is not resisted by fluid pressure since an open passage is provided through the ports 30, 31 and 32. When however, the arm 15 starts its return stroke from the position indicated in Fig. 3, then it first moves the piston 21 into contact with the cup 29 and this part of its movement is not resisted so that the first part of the movement between the axle and the frame from an extreme position toward normal position is done freely, and thereafter the movement toward or beyond normal position is resisted.

To summarize the foregoing, it is to be understood that the several cup members and the pistons with the arrangement of ports, as described, constitute floating check valves, which (1) prevent the flow of fluid through the pistons during the working stroke thereof; (2) permit a free movement of the pistons for a predetermined constant distance immediately preceding the working stroke regardless of the position of the piston at that time; and (3) permit a free return of the piston from its working stroke. It should also be noted that the cups, by their engagement with the bosses formed on the pistons give the pistons lateral support and prevent their slapping or jamming in the cylinder.

Having described the pistons and check valves, I will now describe the construction including the novel relief valves which control the pressures maintained behind the pistons against which the pistons move during their working stroke. Two relief valves are provided, both alike in construction and each arranged at opposite ends of the main cylinder 2. Referring to Figs. 3 and 6, a description of one of the valves will suffice for both of them. As mentioned above, the ends of the cylinder 2 are flared outwardly and internally threaded, as at 3, and between the base of the threads and the wall of the cylinder is formed an obliquely cut shoulder 50. A cup-shaped member 51 with an outwardly flared brim 53 fits into the end of the cylinder with the brim 53 engaging the shoulder 50. The cup member 51 has a lateral opening arranged to match the passageway 7. Suitable packing 54 may lie upon the brim 53 of the cupped member 51 and the parts are secured in place by an exteriorly threaded plug 55. A central aperture 56 is formed in the cupped member 51 through which fluid is forced from the working chamber behind the piston. The member 51 thus forms a closure for the working chamber and at the same time provides a valve seat for the relief valve, to be presently described.

The relief valve is adjustable and comprises essentially a saucer-like disc 60 of resilient stock having its brim engaging the cup 51, as at 61, and having its mid portion supported by the head of a screw 62 threaded in the plug 55. The end of the screw may have a square shank 63 and carry a lock nut 64. The disc 60 may have a small central aperture for receiving a tip 65 (see also Fig. 6) formed in the head of the screw to hold the disc against lateral movement relative to the walls of the cylinder. In idle position the parts lie as shown in Fig. 2 and as shown at the right end of the cylinder in Fig. 3. During the working stroke of the piston, the periphery of the disc is raised from its seat by fluid pressure, as shown in the left end of the cylinder in Fig. 3, as at 70. The disc is made of spring stock and it will be appreciated that resistance of the flow of fluid past the disc and through the opening 56 may be varied according to the adjustment of the screw 62. The right and left relief valves, as depicted in Figs. 2 and 3, may offer like resistance or may be adjusted to provide unlike resistance, if so desired.

Reviewing the parts heretofore described, it will be seen that great simplicity and economy of construction has been arrived at by the use of a number of parts all of which may be formed as simple stampings. Thus both the check valves and the relief valves are formed at least in part of stampings, each of a simple nature, and the assembly of the working parts of the device consist essentially in arranging the stamped parts as described. It will be noted that there is a relative absence of ground joints of close fittings and that all of the parts are rugged and designed for loads and duties greater than will be demanded in use.

In operation, it has been mentioned above, the arm 15 may oscillate idly through a range determined by the spacing of the parts of the check valves behind the pistons. Thereafter as one of the pistons enters its working stroke, fluid is forced through a relief valve at a rate according to the adjustment of the valve and the pressure created by the piston. The fluid flows through the passageway 6 along the passageway 4 to the right, as viewed in Figs. 2 and 3, thence into the main cylinder in the central part thereof and through the returning piston and check valve into the working chamber behind the returning piston. Thus the working chambers behind both pistons are kept full of fluid at all times and the escape from these chambers is always controlled by the adjustable relief valves, as indicated above.

While the foregoing is a description of a preferred form of my invention, I do not care to be limited to that form alone or in any manner other than by the claims appended hereto.

I claim:—

1. A hydraulic shock absorber having a cylinder and a piston slidable therein having a plurality of ports for the passage of fluid therethrough, and means for closing said ports when the piston moves in one direction and opening said ports when the piston moves in the other direction including a cup-shaped member slidably engaging the cylinder and having a radial face engageable with the piston opposite said ports, and including a member held in fixed relation to the piston for limiting the movement of said cup-shaped member away from said piston.

2. In a hydraulic shock absorber having a cylinder and an apertured piston slidable therein, the combination of a boss formed on the piston, a cupped member slidably engaging the cylinder and a second cupped member engaging said boss and slidably engaging said first member, both said members cooperating to give lateral support to the piston and one of said members being engageable with the piston to regulate the flow of fluid therethrough.

3. In a hydraulic shock absorber having a cylinder and an apertured piston slidable therein, the combination of a boss formed on the piston, a cupped member having side walls slidably engaging the cylinder, and a second cupped member engaging said boss having side walls and slidably engaging the interior of said first member, both said members cooperating to give lateral support to the piston and the first of said members being free to oscillate longitudinally between the piston and the second member.

4. The combination of a cylinder containing liquid, a piston having ports for the passage of liquid and being slidable in said cylinder, a closure member for one end of the cylinder forming a working chamber behind the piston, a relief valve associated with said closure member and a check valve associated with said piston, said check valve including a cup shaped part slidably engaging the cylinder and having a radial portion overlying the ports in the piston when the piston moves to engagement with said part.

5. The combination of a cylinder containing liquid, a piston having ports for the passage of fluid and being slidable in said cylinder, a closure member for one end of the cylinder forming a working chamber behind the piston, a relief valve associated with said closure member and a check valve associated with said piston, said check valve including a cup shaped part slidably engaging the cylinder and having a radial portion overlying the ports in the piston when the piston moves to engagement with said part, and means carried by the piston for engaging said part on the side opposite the piston.

6. In a hydraulic shock absorber comprising a cylinder and a piston slidable in said cylinder, the combination of means associated with the piston for allowing fluid to flow past the piston when it moves in one direction and for obstructing the passage of fluid when it moves in the other direction, a closure member for one end of the cylinder forming a working chamber behind the piston and a valve for controlling the flow of fluid through said closure member comprising a resilient saucer-like member having its periphery engaging the closure member and having its mid portion spaced a certain distance from the closure member.

7. In a hydraulic shock absorber comprising a cylinder and a piston slidable in said cylinder, the combination of a closure member for one end of the cylinder forming a working chamber behind the piston and a valve for controlling the flow of fluid through said closure member comprising a resilient saucer-like member having its periphery engaging the closure member and having its mid portion spaced a certain distance from the closure member.

8. A fluid check device, the combination of a piston movable in a working chamber, a one-way valve for controlling the outflow of fluid from said chamber, said valve comprising a resilient saucer-like member fixedly supported in its mid portion and a part engaged by the periphery of said member, said member being bodily flexed from contact with said part in response to pressures developed in said chamber.

9. A two-way acting hydraulic shock absorber, comprising a main cylinder, an operating arm having a part extending into the cylinder, oppositely facing pistons resiliently urged into contact with the end of said arm, centrally apertured closure members for the ends of said cylinder forming working chambers behind each of said pistons, passageways from points behind said closure members leading to the mid portion of said cylinder between said oppositely facing pistons, and means for allowing the flow of fluid from said working chambers into said passageways according to the pressures created in said chambers comprising saucer-shaped resilient members having edge contact with the outside of said closure members and having their mid portions adjustably positioned relative to said closure members.

10. A two-way acting hydraulic shock absorber, comprising a main cylinder, an operating arm having a part extending into the cylinder, oppositely facing pistons each having a plurality of ports and resiliently urged into contact with the end of said arm, centrally apertured closure members for the ends of said cylinder forming working chambers behind each of said pistons, passageways from points behind said closure members leading to the mid portion of said cylinder between said oppositely facing pistons, means for restricting the flow of fluid from said working chambers into said chambers comprising saucer-shaped resilient members having edge contact with the outside of said closure members and having their mid portions adjustably positioned relative to said closure members, and means for closing the ports in said pistons during a working stroke including parts slidable in said cylinder, each part being engaged by one of said pistons after it has begun a working stroke and moved a certain amount.

11. In a shock absorber having a cylinder, the combination of a piston slidable therein and having an apertured head, a return spring acting to move the piston, a member having an apertured radial part carried by the piston and engaged by said spring and having its apertured radial part spaced from the apertured head of the piston, and a cup like member having side walls engaging the cylinder and an apertured radial part interposed between said head of the piston and the radial part of the first member and movable therebetween and being movable in said cylinder in one direction by contact with the said head of the piston and in the other direction by contact with said first named member.

12. In a hydraulic shock absorber, a cylinder and a piston slidable in said cylinder, a relief valve disposed at one end of said cylinder, said relief valve including a cup shaped member with an outwardly flared brim fitting into the end of said cylinder, said cup shaped member having a lateral opening communicating with a passage way in said cylinder, a plug for retaining said cup shaped member in position, said cup shaped member having a central aperture through which fluid is forced from the working chamber behind the piston, and a concavo-convex member of resilient stock having its brim engaging a portion of said cup shaped member and having its mid portion supported by the head of a screw threaded in the plug.

13. In a hydraulic shock absorber having a body portion provided with a piston chamber having pistons movable therein and end walls, said end walls having ports therein, the combination of a fluid chamber behind each end wall, a passage connecting each of said fluid chambers and a valve for governing the passage of fluid through said port, said valve comprising a concavo-convex disk and being adjustable bodily toward and away from said port and being flexible whereby pressures developed in said piston chamber raise the valve and force fluid past said valve without bodily moving the same.

14. In a hydraulic shock absorber comprising a cylinder and a piston slidable in said cylinder, flared end portions at the ends of said cylinder, a cup shaped member disposed in each end of said cylinder, said cup member having a lateral opening and a circular member adapted to lie within said cup shaped member and abut thereagainst and a plug for securing said cup shaped member in position.

15. In a hydraulic shock absorber comprising a cylinder and a piston slidable in said cylinder, cup shaped members located at opposing ends of said cylinder, plugs having a screw thread engagement with the ends of said cylinder and adapted to retain said cup shaped member in position, and a circular member fixedly supported in its mid portion on each of said plugs, said member being bodily flexed from contact with said cup shaped member in response to pressures developed in said chamber.

16. In a hydraulic shock absorber comprising a cylinder and a piston slidable in said cylinder, a one-way valve for controlling the outflow of fluid from said chamber, said valve including a cup shaped member disposed in the end of said cylinder, a plug for retaining said cup shaped member in position, packing material interposed intermediate said cup shaped member and said plug, a concavo-convex disc abutting against said cup shaped member and being supported in its mid portion by said plug.

JOHN SNEED.